US012647585B2

(12) United States Patent
Li et al.

(10) Patent No.: US 12,647,585 B2
(45) Date of Patent: Jun. 2, 2026

(54) COMPUTER SOFTWARE MODULE, A DEVICE AND A METHOD FOR ACCELERATING INFERENCE FOR COMPRESSED VIDEOS

(71) Applicant: Telefonaktiebolaget LM Ericsson (publ), Stockholm (SE)

(72) Inventors: Yun Li, Lund (SE); Saeed Bastani, Dalby (SE); Andreas Kristensson, Södra Sandby (SE); Alexander Hunt, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 687 days.

(21) Appl. No.: 17/605,786

(22) PCT Filed: Apr. 23, 2019

(86) PCT No.: PCT/EP2019/060379
§ 371 (c)(1),
(2) Date: Oct. 22, 2021

(87) PCT Pub. No.: WO2020/216438
PCT Pub. Date: Oct. 29, 2020

(65) Prior Publication Data
US 2022/0217378 A1     Jul. 7, 2022

(51) Int. Cl.
| | |
|---|---|
| *H04N 19/105* | (2014.01) |
| *G06N 5/046* | (2023.01) |
| *G06V 10/40* | (2022.01) |
| *H04N 19/119* | (2014.01) |
| *H04N 19/139* | (2014.01) |
| *H04N 19/159* | (2014.01) |
| *H04N 19/172* | (2014.01) |
| *H04N 19/30* | (2014.01) |

| | |
|---|---|
| *H04N 19/436* | (2014.01) |

(Continued)

(52) U.S. Cl.
CPC ........... *H04N 19/436* (2014.11); *G06N 5/046* (2013.01); *G06V 10/40* (2022.01); *H04N 19/105* (2014.11);
(Continued)

(58) Field of Classification Search
None
See application file for complete search history.

(56) References Cited

U.S. PATENT DOCUMENTS

| | | |
|---|---|---|
| 2014/0300758 A1 | 10/2014 | Tran |
| 2018/0032846 A1 | 2/2018 | Yang et al. |

(Continued)

FOREIGN PATENT DOCUMENTS

| | | |
|---|---|---|
| CN | 107729799 A | 2/2018 |
| CN | 108307193 A | 7/2018 |
| WO | 2018170393 A2 | 9/2018 |

OTHER PUBLICATIONS

Chang, Huang-Chang, et al., "Robust camera motion estimation and classification for video analysis", Visual Communications and Image Processing, Proceedings of SPIE-IS&T Electronic Imaging, SPIE vol. 5308, 2004, pp. 912-923.
(Continued)

*Primary Examiner* — Samuel D Fereja
(74) *Attorney, Agent, or Firm* — Murphy, Bilak & Homiller, PLLC

(57) ABSTRACT
A method for accelerating inference for compressed videos, the method comprising: extracting (220) features for a frame comprised in a compressed bit stream; generating (230) a partition map comprising zero or more partitions; determining (240) a total area covered by the zero or more partitions; comparing (250) the total area covered to a threshold; if the total area covered exceeds the threshold, generating (260) a motion vector map and warping (290) the feature maps based on the motion vector map.

10 Claims, 5 Drawing Sheets

(51) Int. Cl.

| | |
|---|---|
| *H04N 19/513* | (2014.01) |
| *H04N 19/587* | (2014.01) |
| *H04N 19/85* | (2014.01) |

(52) U.S. Cl.

CPC ......... *H04N 19/119* (2014.11); *H04N 19/139* (2014.11); *H04N 19/159* (2014.11); *H04N 19/172* (2014.11); *H04N 19/30* (2014.11); *H04N 19/513* (2014.11); *H04N 19/587* (2014.11); *H04N 19/85* (2014.11)

(56) References Cited

U.S. PATENT DOCUMENTS

| | | | |
|---|---|---|---|
| 2018/0293737 | A1 | 10/2018 | Sun et al. |
| 2018/0295375 | A1 | 10/2018 | Ratner |
| 2020/0012940 | A1* | 1/2020 | Liu ..................... H04N 7/0135 |

| | | | | |
|---|---|---|---|---|
| 2022/0141462 | A1* | 5/2022 | Na ..................... | H04N 19/117 |
| | | | | 375/240.03 |

OTHER PUBLICATIONS

Desappan, Kumar, et al., "CNN Inference: Dynamic and Predictive Quantization", 2018 IEEE 8th International Conference on Consumer Electronics, Berlin, Sep. 2, 2018, pp. 1-4.

Kuhn, Peter M., "Camera Motion Estimation Using Feature Points in MPEG Compressed Domain", International Conference on Image Processing Proceedings, Piscataway, NJ, IEEE, Sep. 10, 2020, pp. 596-599.

Zhu, Xizhou, et al., "Deep Feature Flow for Video Recognition", arXiv:1611.07715v2 [cs.CV], Jun. 5, 2017, pp. 1-13.

Zhu, Xizhou, et al., "Towards High Performance Video Object Detection for Mobiles", arXiv:1804.05830v1 [cs.CV], Apr. 16, 2018, pp. 1-18.

* cited by examiner

COMPUTER SOFTWARE MODULE, A DEVICE AND A METHOD FOR ACCELERATING INFERENCE FOR COMPRESSED VIDEOS

TECHNICAL FIELD

The present invention relates to a viewing device comprising computer software modules, a viewing device comprising circuits, a device and a method for providing an improved manner of providing fast inference and energy preservation for compressed video, and in particular to a viewing device comprising computer software modules, a viewing device comprising circuits, a device and a method for providing an improved manner of providing efficient inference utilizing convolutional neural networks.

BACKGROUND

Video communication and viewing is growing in popularity. At the same time the public demand on high quality video feeds is increasing. This increases the requirements of the compression algorithms to enable a pleasant viewing experience and to transmit and store these data efficiently.

A digital video sequence or stream consists of a series of images. In video compression a video stream is compressed by using intra-prediction and inter-prediction, transform, quantization, and entropy coding. For inter-prediction, motion vectors between two images are identified, only data for the quantized residuals after the prediction and the motion vectors together with the side information need to be entropy encoded and/transmitted and the receiving viewing device then only have to decode the data for the intra-predicted reference images and then predict each block of frames by using the motion vectors if the block is inter-predicted, and in addition to this, intra-prediction is also performed for blocks that are intra-predicted.

An inter coded frame is divided into blocks or partitions. After that, instead of directly encoding the raw pixel values for each block, the encoder will try to find a block similar to the one it is encoding on a previously encoded frame, referred to as a reference frame. This process is done by a block matching algorithm. If the encoder decided to use inter-prediction mode by a rate-distortion process, the block could be predicted by a vector, known as motion vector, which points to the position of the matching block at the reference frame. The process of motion vector determination is called motion estimation.

In most cases the encoder decides to use the inter-prediction mode based on a rate-distortion process if the reference frames and the current frame are similar, but the block found is likely not an exact match to the block it is encoding. The encoder will then compute the differences between them. Those residual values are known as the prediction error and need to be transformed, quantized, entropy encoded, and sent to the decoder.

In summary, if the similarities between the reference frames and the current frame are high, a large part of the frame will be inter-predicted and encoded using inter-prediction modes. This will reduce the coding bit-rate dramatically.

In general, there are three types of frames: intra-predicted frame (I frame) and inter-predicted frame (P and B frame). The inter-predicted frame is as described, and the intra-predicted frame needs to be encoded periodically to allow random access, and to provide refresh points if errors occurs due to packet loss or other types of data loss.

P-frame is the term used to define the forward Predicted pictures. The prediction is made from an earlier picture, and this can be both from an I frame or from an inter-predicted frame, so that high compression efficiency can be achieved. The amount of data needed for doing this prediction consists of motion vectors and quantized transform coefficients describing prediction errors.

B-frame is the term for bidirectionally predicted pictures. This kind of prediction method improves the compression efficiency, because it can predict the current image signal from an earlier or later frame, and from a combination of them. Similar to P-frames, B-frames are expressed as motion vectors and transform coefficients.

Different coding schemes denote the blocks, or areas around features, using different terminology. Some examples are macro blocks, used in the MPEG (Moving Picture Expert group) standard, Control Unit partition, used in the VCC (Versatile Video Coding) standard, and Prediction Unit partition, used in the H.265 standard. For the purpose of this application, the term partition will be used and should be considered to cover blocks, macro blocks, CU partitions, PU partitions and other terminologies used in other coding standards.

The process of determining or detecting the features is part of inference along with making prediction based on the features and requires repeated image recognition which is both complicated and requires a great amount of computing resources. In some systems, convolutional neural networks (CNN) have been used to perform the feature detection as CNNs have the benefit of not requiring advance knowledge and are easily trained.

Significant improvements on object classification/detection have been achieved with Convolutional Neural Network (CNN) or its variations during recent years. This is especially prominent on the image domain and for low complexity algorithms. Although, some researches have also focused on inference for videos with respect to low complexity and low energy consumptions, the major attention is still on the pixel domain of images from a video. However, raw videos/images are usually in compressed format and this is in practice commonplace both for storage and video streaming.

A convolutional neural network consists of an input and an output layer, as well as multiple hidden layers. Convolutional layers apply a convolution operation to the input, passing the result to the next layer. The convolution emulates the response of an individual neuron to visual stimuli, where each convolutional neuron processes data only for its receptive field.

However, even using CNNs the inference is costly with respect to computational resources. Some works have tried to improve the inference by estimating optical flows between correlated video frames and then utilizing the optical flows to warp or shift the intermediate feature maps received from the CNN by exploiting the correlation between the two frames. These approaches can accelerate the inference for videos, but, they require that the optical flow estimation process is executed to determine the correlation, which also require vast computational resources.

There is thus a need for a viewing apparatus comprising computer software modules that are loaded into and executed by the viewing apparatus, a viewing apparatus comprising circuits, a viewing device and a method for providing an accelerated inference for decoded video streams.

SUMMARY

An object of the present teachings is to overcome or at least reduce or mitigate the problems discussed in the background section.

The inventors have realized (after insightful and inventive reasoning) that as the optical flow process is needed to determine the correlation between two frames, which may require significant resources (processing time and energy for a device), The inventors have further realized (after insightful and inventive reasoning) that extra estimation for optical flow on the pixel domain of video frames may not be necessary as for correlated video frames in compressed format, prediction modes and motion vectors are cost-free features that are available in the partially decoded videos as they are featured in the compressed domain. The motion vectors may thus be retrieved at no extra cost and they are also relatively accurate because they are obtained with a rate distortion process from the encoder.

The inventors therefore propose a solution where a motion vector map is generated from the Coding Unit/ Prediction Unit (CU/PU) partition and motion vectors of the partially decoded video stream. In the context of for example the coding format H.265, prediction is made on the PU, and in the context of for example the coding format VCC (Versatile Video Coding), the prediction is made on the CU directly. The proposed solution includes determining the coverage of the features (or macro blocks) with macro blocks to a threshold and if the coverage exceeds the threshold, the motion vector maps is applied to warp (shift) the feature maps from the later stage of a CNN for inference.

According to one aspect a method for accelerating inference for compressed videos is provided, the method comprising: extracting features for a frame comprised in a compressed bit stream; generating a partition map comprising zero or more partitions; determining a total area covered by the zero or more partitions; comparing the total area covered to a threshold; if the total area covered exceeds the threshold, generating a motion vector map and warping the feature maps based on the motion vector map. The total area is the area having motion vectors.

This has the benefit that features available for free, that is without complicated computations, are utilized.

In one embodiment the method further comprises performing a full inference for the frame if the total area covered does not exceed the threshold.

In one such embodiment the full inference is performed utilizing a Convolutional Neural Network (CNN).

In one embodiment the method further comprises receiving at least a portion of the bit stream and partially decompress at least a portion of the received bit stream before extracting the compressed features.

In one embodiment the method further comprises interpolating any missing partitions.

In one embodiment the method further comprises down sampling the motion vector map based on the size of a feature map.

In one embodiment the threshold is 50, 55, 60, 65, 70, 75 or 80%, or in any of the ranges 50-60, 60-70, 70-80, or 80-90%.

In one embodiment the bit stream comprises at least one inter-predicted predicted frame (P frame/B frame).

According to one aspect of the teachings herein a viewing device is provided, the viewing device comprising a controller, wherein the controller is configured to: extract features for a frame comprised in a compressed bit stream; generate a partition map comprising zero or more partitions;

determine a total area covered by the zero or more partitions; compare the total area covered to a threshold; if the total area covered exceeds the threshold, generate a motion vector map and warp the feature maps based on the motion vector maps.

According to one aspect a viewing apparatus comprising computer software modules for accelerated inference for compressed video is provided, the viewing apparatus comprising: a feature extraction computer software module configured to extract features for a frame comprised in a compressed bit stream; a partition map generation computer software module configured to generate a partition map comprising zero or more partitions; an area determining computer software module configured to determine a total area covered by the zero or more partitions; a comparing computer software module configured to compare the total area covered to a threshold; a motion vector map generating computer software module configured to generate a motion vector map if the total area covered exceeds the threshold and a warping computer software module configured to warp the feature maps based on the motion vector map if the total area covered exceeds the threshold.

According to one aspect a viewing apparatus comprising circuits for accelerated inference for compressed video is provided, the viewing apparatus comprising: a feature extraction circuit configured to extract features for a frame comprised in a compressed bit stream; a partition map generating circuit configured to generate a partition map comprising zero or more partitions; a total area determination circuit configured to determine a total area covered by the zero or more partitions; a comparing circuit configured to compare the total area covered to a threshold; a motion vector map generating circuit configured to generate a motion vector map if the total area covered exceeds the threshold and a warping circuit configured to warp the feature maps based on the motion vector map if the total area covered exceeds the threshold.

BRIEF DESCRIPTION OF THE DRAWINGS

Embodiments of the invention will be described in the following, reference being made to the appended drawings which illustrate non-limiting examples of how the inventive concept can be reduced into practice.

As this application relates to handling and manipulation of color, there will be a triple set of figures for each figure illustrating a view of the viewing device disclosed herein. A first figure will be in color and denoted 'A', a second figure will be a greyscale figure denoted 'B', and a third figure will be a schematic figure denoted 'C' showing the problem and/or effect in an illustrative manner.

DETAILED DESCRIPTION

Figures 1, 2:
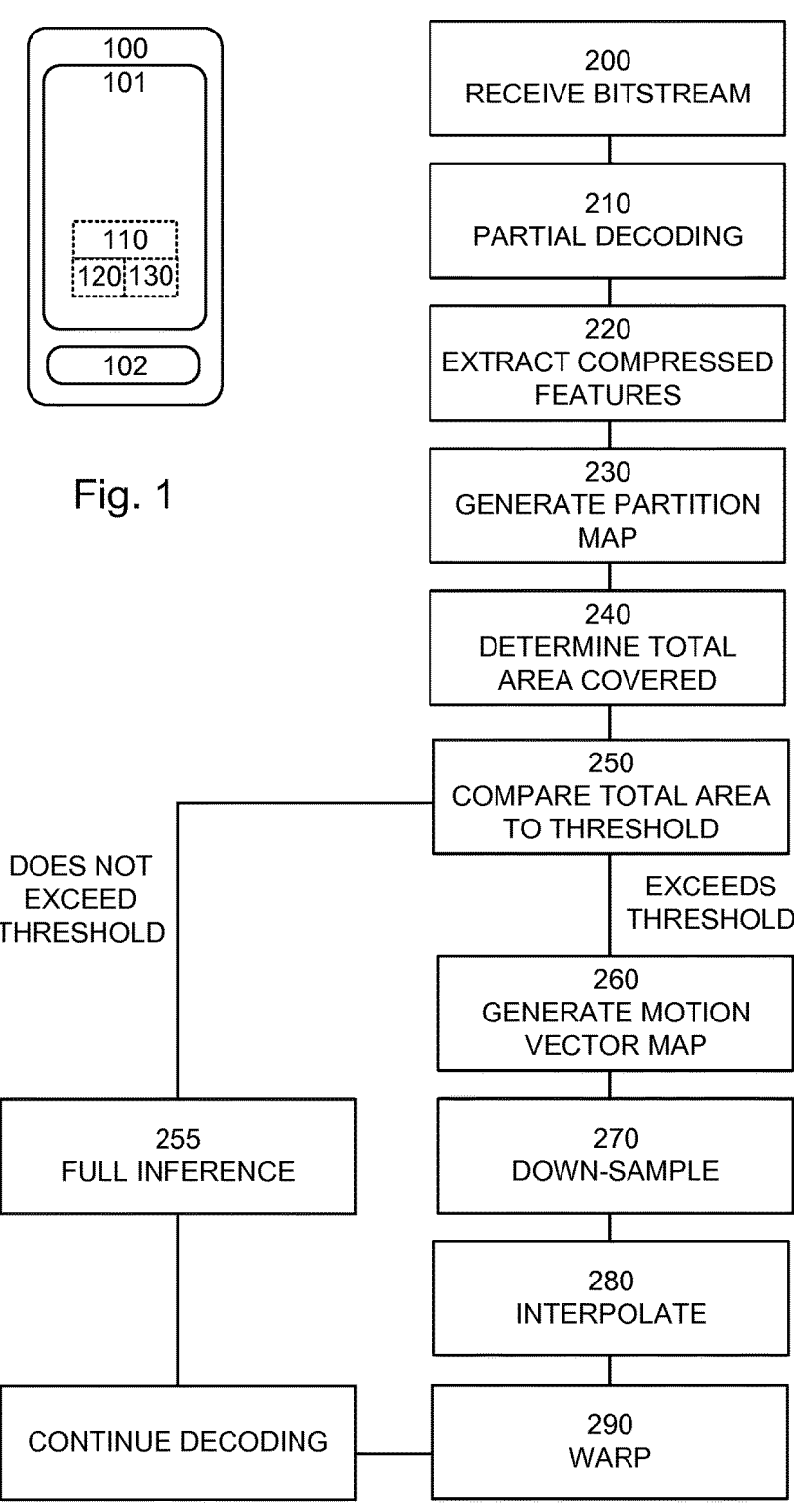
FIG. 1 shows a schematic view of a viewing device according to an embodiment of the present invention.
FIG. 2 shows a flowchart of a general method according to an embodiment of the present invention.

FIG. 1 shows a schematic view of a viewing device 100 according to an embodiment of the present invention. In one embodiment the viewing device 100 comprises a user interface including a display 101, and possibly one or more buttons 102. The one or more buttons may be physical and/or virtual and may vary in size, number and function. In one embodiment the viewing device 100 is arranged to be connected to a user interface including a display 101.

The viewing device 100 comprises a controller 110 for controlling the operation of the viewing device 100. The controller 110 may comprise one or several processors, such as general purpose processors and/or graphics processors, and/or other programmable circuits. As a skilled person would understand, the operation of the viewing device may be distributed over the processors of the controller, but for illustrative purposes, reference will be given to a single controller 110.

The viewing device 100 also comprises a computer-readable memory 120 for storing computer-readable instructions, which when loaded into and executed by the controller execute the operation of the viewing device, including the teachings of this application. The memory 120 may be implemented using any commonly known technology for computer-readable memories such as ROM, RAM, SRAM, DRAM, FLASH, DDR, SDRAM or some other memory technology. In one embodiment the memory 120 is configured to store a compressed video stream to be decompressed.

In one embodiment, the viewing device 100 also comprises a communication interface 130 for receiving the video stream to be compressed. The communication interface may be wired and/or wireless and be based on communication interface standards such as Universal Serial Bus®, Ethernet®, RS232, Bluetooth®, IEEE 802.11b (WiFi®), and/or cellular communication standards such as Long term Evolution (LTE).

FIG. 2 shows a flowchart of a general method according to an embodiment of the teachings herein. The method may be executed by a controller 110 of a viewing device 100 as taught herein.

As would be understood by a skilled person, functions as disclosed herein may be performed by executing computer software being loaded into a controller or by hardware circuits being designed to perform the functions, possibly by being loaded with a computer software module.

Figure 3A:
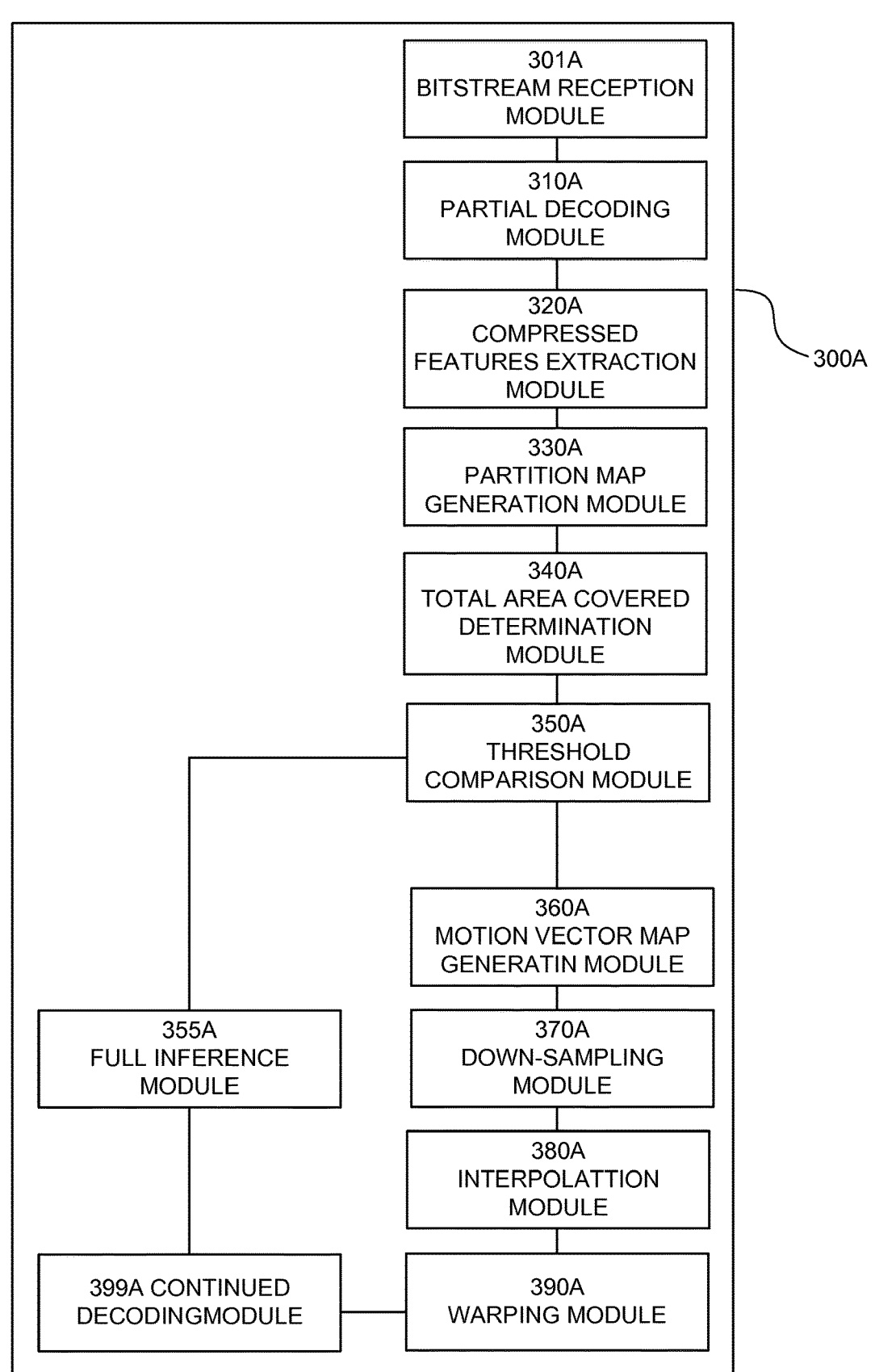
FIG. 3A shows a viewing apparatus according to an embodiment of the present invention.

FIG. 3A shows a schematic view of a viewing apparatus 300A according to an embodiment of the teachings herein comprising computer software modules. The computer software modules may be loaded into and executed by a controller 110 of a viewing device 100 as taught herein, the viewing device 100 then being an embodiment of the viewing apparatus (300A).

Figure 3B:
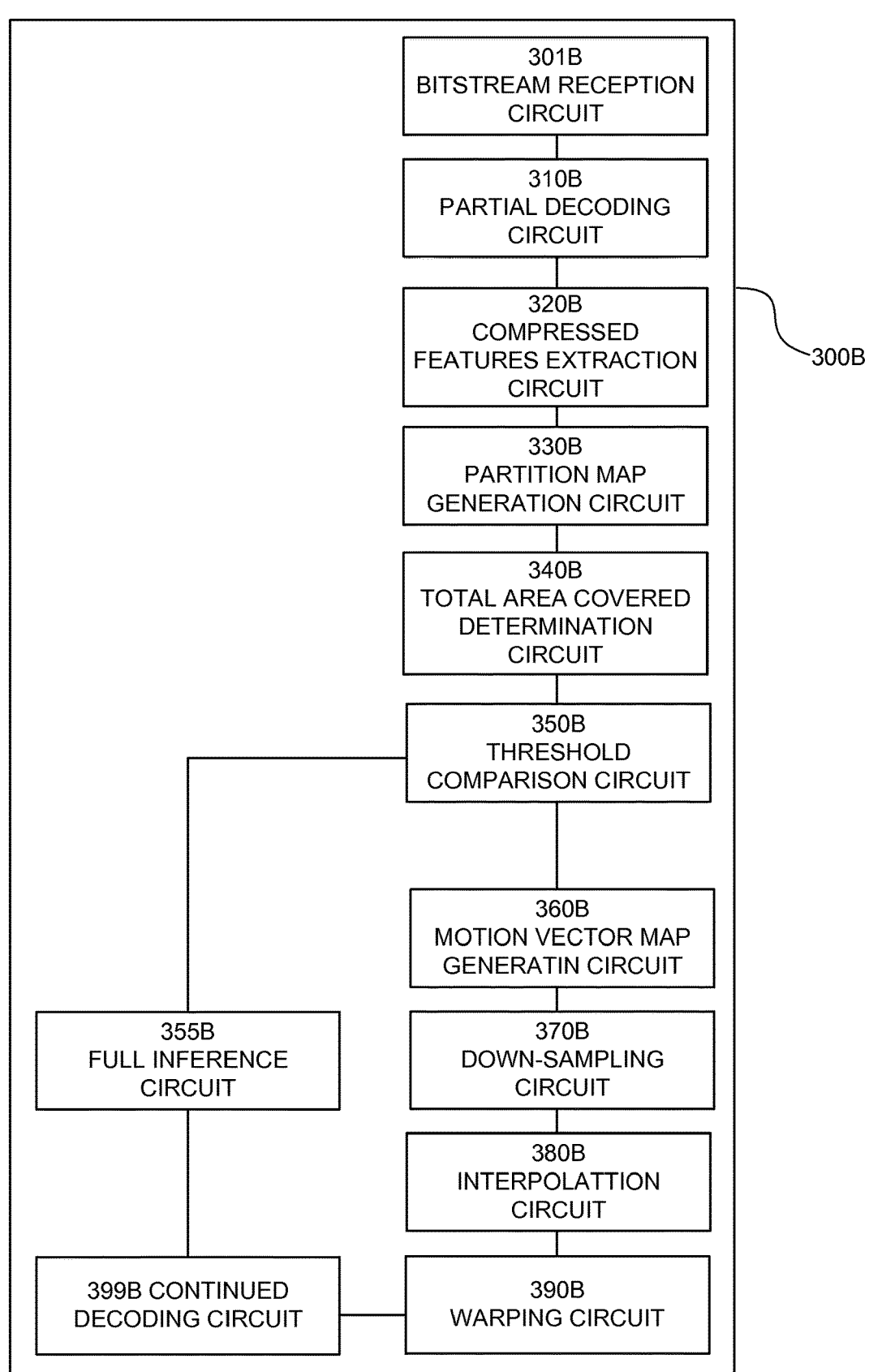
FIG. 3B shows a schematic view of a viewing apparatus comprising circuits according to an embodiment of the present invention.

FIG. 3B shows a schematic view of a viewing apparatus 300B according to an embodiment of the teachings herein comprising circuits configured to perform and execute the teachings herein. The viewing apparatus 300B may be comprised in or comprised a viewing device 100 as taught herein. The circuits may be hardware circuits or a programmable circuit loaded with computer instructions.

The proposed solution will be described in more detail with simultaneous reference to the viewing device of FIG. 1, the method of FIG. 2, the viewing apparatus 300A of FIG. 3A and the viewing apparatus 300B of FIG. 3B.

Figure 4:
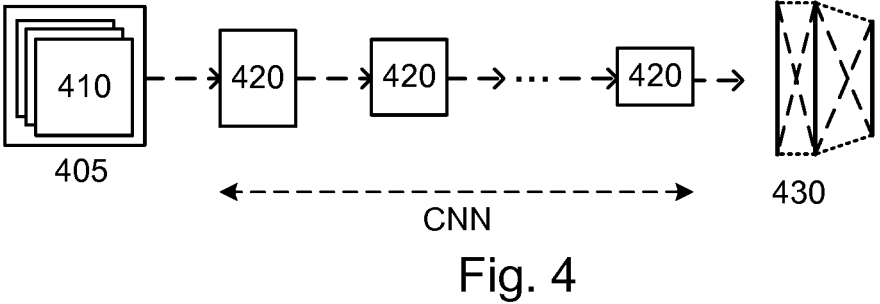
FIG. 4 shows a schematic view of a general process for inference by using a CNN on the image domain according to an embodiment of the present invention.

A bit stream corresponding to a video sequence is received 200, by the device 100 through the communication interface 103 and/or from the memory 102 or by a bit stream corresponding to a video sequence receiving module 301A or by a bit stream corresponding to a video sequence receiving circuit 301B, for inference with a CNN. FIG. 4 shows a schematic view of a general process for performing inference by using a CNN. A bit stream 405 corresponding to the video sequence and comprising one or more image frames 410 is received and decoded and put through the various layers 420 of the CNN. The inference results could be classification, object detection, prediction, etc.

The video stream 410 is encoded by using modern video encoders, e.g., MPEG, H.265 and VVC. A partial decoding is performed 210 upon receiving the compressed video/image, in one embodiment by executing a partial decoding module 310A of the viewing apparatus 300A, by utilizing a partial decoding circuit 310B of the viewing apparatus 300B or by the controller 101 being configured to do so. The partial decoding includes a depacketization and an entropy decoding. Based on the partial decoding the partition map is generated 230 by extracting 220 compressed domain features, in one embodiment by executing a partition map generation module 330A and a compressed feature extraction module 320A of the viewing apparatus 300A, executing a partition map generation circuit 330B and a compressed feature extraction circuit 320B of the viewing apparatus 300B or by the controller 101 being configured to do so. It should be noted that the extraction of the teachings herein is not an estimation, such as when an optical flow is estimated or determined. The extraction is simply a retrieval of already existing features or data, possible including some formatting and simple computation, but no resource-hungry calculations. As the extraction is of already existing features, the extraction is regarded as being costless regarding computational resources. The actual information that resides is extracted and the format thereof depends on the syntax of the codec being used, but includes partitions, prediction modes, and motion vectors.

Figure 5:
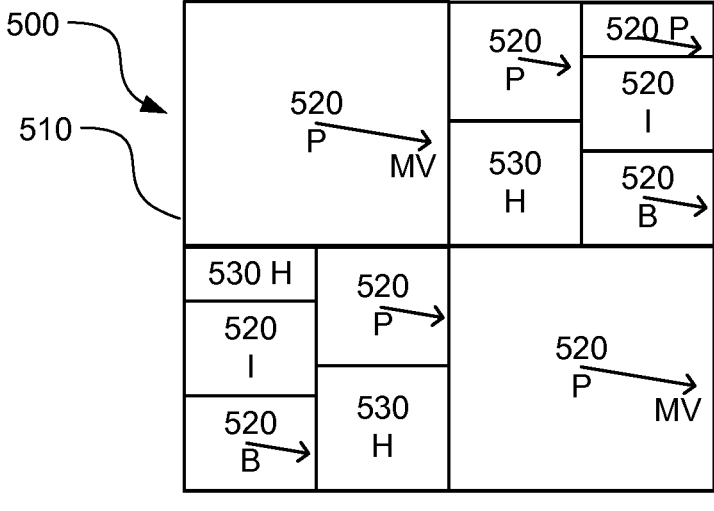
FIG. 5 shows a schematic view of a partition map according to an embodiment of the present invention.

FIG. 5 shows a schematic view of a partition map 500. The partition map 500 has an extent 510 that corresponds to an image frame and that is divided into several individual partitions 520. For each partition 520, a prediction mode (i.e. type of prediction frame) I, P, B is indicated as well as the motion vector, indicated and represented by arrows MV (for illustrative purposes, the reference MV is only indicated for the larger partitions 520, but apply equally to the arrows of the smaller partitions 520). As can be seen, the partition map 500 also comprises holes 530 referenced H. The holes are partitions which are intra-predicted.

If the prediction mode indicates that the current partition 520 is inter-frame predicted (as indicated by references P and B), it shows that the partition 520 of the current frame 510 can be obtained from a reference frame using the motion vectors. The reference frames are frames from which the current frame is predicted.

The total area covered by inter-frame predicted partitions, i.e. the area having or being covered by motion vectors, is determined 240, in one embodiment by executing a covered area determination/calculation module 340A of the viewing apparatus 300A, utilizing a covered area determination/ calculation circuit 340B of the viewing apparatus 300B or by the controller 101 being configured to do so.

The total covered area is compared 250 to a threshold value, in one embodiment by executing a threshold comparison module 350A of the viewing apparatus 300A, by utilizing a threshold comparison circuit 350B of the viewing apparatus 300B or by the controller 101 being configured to do so. In one embodiment the threshold is 75%. In one embodiment the threshold is 50, 55, 60, 65, 70, 75 or 80%. In one embodiment the threshold is in the range 50-60, 60-70, 70-80, or 80-90%. In one embodiment the threshold value can be learned with machine learning and adjusted as a trade-off between accuracy and efficiency with other algorithms.

If the total area covered by inter-frame predicted partitions exceeds a threshold, it is assumed that the current image frame can be approximated by its reference frames and motion vectors.

In such a case, a motion vector map is built up 260 based on each partition 520, its associated motion vectors and reference frame, in one embodiment by executing a motion vector map generation module 360A of the viewing apparatus 300A, by executing a motion vector map generation circuit 360B of the viewing apparatus 300B or by the controller 101 being configured to do so. Each partition of the map can contain multiple references and associated vectors. The number of references is pre-determined by the encoder configuration. The motion vector map may be generated from the partition map 500 by adding the motion vectors to each corresponding partition 520, the motion vector map thus being a partition map 500 with motion vectors.

A down-sampling is performed 270 according to the size of the feature map(s) generated by the CNN 420, in one embodiment by executing a down-sampling module 370A of the viewing apparatus 300A, by utilizing a down-sampling circuit 370B of the viewing apparatus 300B or by the controller 101 being configured to do so.

The holes 530 without motion vectors can be filled in by or interpolated 280 using a simple interpolation processes, in one embodiment by executing an interpolation module 380A of the viewing apparatus 300A, by utilizing an interpolation module 380B of the viewing apparatus 300B or by the controller 101 being configured to do so.

The motion vectors are then applied to warp 290 or shift the feature map outputted from the convolutional layer 420, in one embodiment by executing a warping module 390A of the computer software module 300A, by utilizing a warping circuit 390 of the viewing apparatus 300B or by the controller 101 being configured to do so.

This avoids the frame going through the entire process for inference as a deep CNN can be over 100 layers deep.

On the other hand, if the total area of inter-frame predicted partitions is smaller than the threshold, the frame will instead go through the complete inference 255 utilizing all the CNN layers 422, in one embodiment by executing a CNN inference module 355A of the computer software module 300A, by utilizing a CNN inference circuit 3556 of the viewing apparatus 300B or by the controller 101 being configured to do so.

The decoding of the bit stream will then be continued, repeating the manner discussed above until the bit stream is decoded, in one embodiment by executing a continued decoding module 399A of the of the viewing apparatus 300A, by utilizing a continued decoding circuit 3996 of the viewing apparatus 300B.

Figure 6:
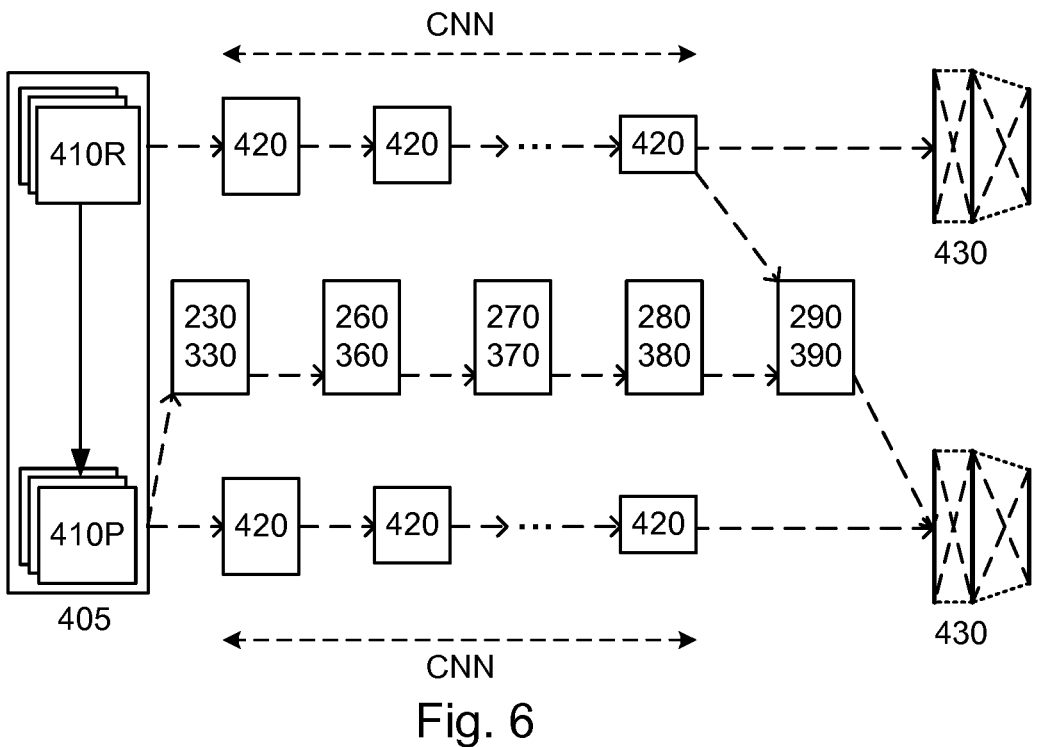
FIG. 6 shows a schematic view of how the teachings herein is applied to a bit stream that is about to undergo inference as depicted in FIG. 4 according to an embodiment of the present invention.

FIG. 6 shows a schematic view of how the teachings herein is applied to a bit stream that is about to undergo inference as depicted in FIG. 4. As can be seen, the bit stream comprises both reference frames 410R and predicted frames 410P. If a frame 410 is a predicted frame having a good coverage, that frame 410 does not have to undergo the full inference utilizing the CNN 420 and it follows the path of the predicted frames 410P of FIG. 6. If the frame is a frame having low coverage it is deemed to be a reference frame 410R and has to undergo full inference. The arrow from the reference frame 410R to the predicted frame 410P in FIG. 6 indicates that the predicted frame 410P is to be predicted based on the reference frame 410R. The arrow from the last layer 420 of the CNN for the reference frame 410R to the warping procedure 290/390 indicates that the warping for the predicted frame 410P is to be based on the result of the inference for the corresponding reference frame 410R.

Figure 7:
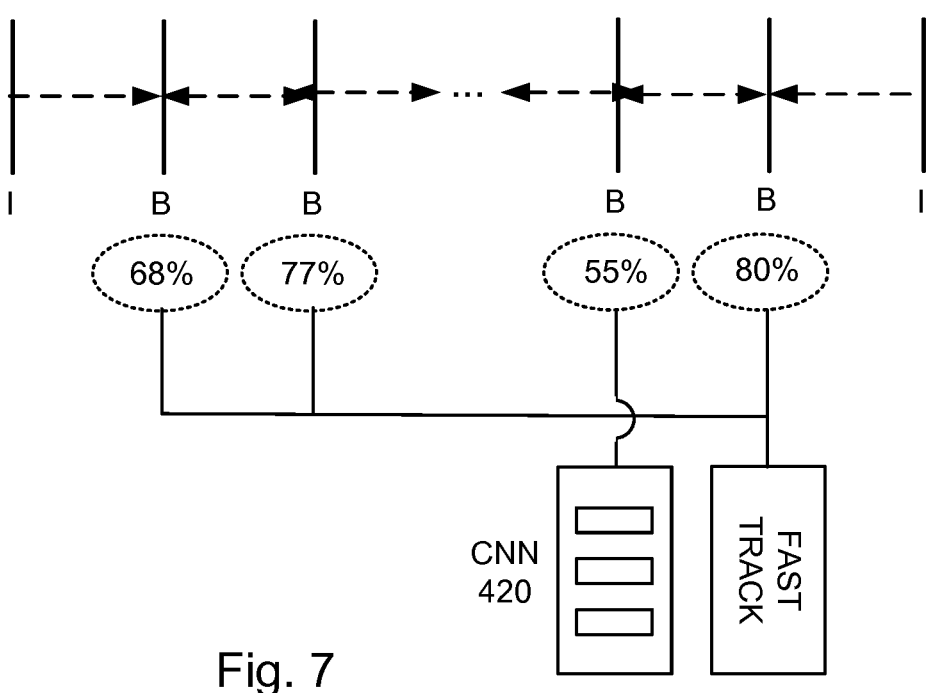
FIG. 7 is a schematic view of how the selection process of the system herein is applied to a stream of frames according to an embodiment of the present invention.

Utilizing bidirectional frames (B frames), the compression efficiency is improved further. FIG. 7 is a schematic view of how the selection process is applied to a stream of frames. In FIG. 7 a stream of frames is depicted. The frames are either I frames (reference frames) or predicted frames (here only B frames are shown, but also P frames are possible). The dashed arrows indicate the dependency of the predicted frames B. also indicated for each frame is a coverage number indicating the total area covered. The number is not given for the reference frames. Those predicted frames having a total area covered that exceeds a threshold does not need to undergo full inference. In the example of FIG. 7 the threshold is set at 60%.

As would be understood to a skilled person, the teachings herein are also applicable to other inference processes, and are not only suitable for inference using CNNs, they could apply to any methods as long as significant correlation exists between the input and the computed features.

The invention claimed is:

1. A method for accelerating inference for compressed videos, the method comprising:
extracting features for a frame comprised in a compressed bit stream;
generating a partition map comprising zero or more partitions;
determining a total area covered by the zero or more partitions;
comparing the total area covered to a threshold; and,
selectively either (a) generating a motion vector map and warping the feature maps based on the motion vector map or (b) performing a full inference for the frame, depending on whether the total area covered exceeds the threshold.

2. The method of claim 1, wherein the method comprises performing a full inference for the frame, responsive to determining that the total area covered does not exceed the threshold.

3. The method of claim 2, wherein the full inference is performed utilizing a Convolutional Neural Network (CNN).

4. The method of claim 1, further comprising:
receiving at least a portion of the bit stream and
partially decompressing at least a portion of the received bit stream before extracting the compressed features.

5. The method of claim 1, further comprising:
interpolating any missing partitions.

6. The method of claim 1, further comprising:
downsampling the motion vector map based on the size of a feature map.

7. The method of claim 1, wherein the threshold is 50, 55, 60, 65, 70, 75 or 80%, or in any of the ranges 50-60, 60-70, 70-80, or 80-90%.

8. The method of claim 1, wherein the bit stream comprises at least one inter-predicted predicted frame (P frame/B frame).

9. A viewing apparatus for accelerating inference in video decompression, the viewing apparatus comprising:

a feature extraction circuit configured to extract features for a frame comprised in a compressed bit stream;

a partition map generating circuit configured to generate a partition map comprising zero or more partitions;

a total area determination circuit configured to determine a total area covered by the zero or more partitions;

a comparing circuit configured to compare the total area covered to a threshold;

a motion vector map generating circuit configured to generate a motion vector map responsive to the comparing circuit determining that the total area covered exceeds the threshold; and a warping circuit configured to warp the feature maps based on the motion vector map responsive to the comparing circuit determining that the total area covered exceeds the threshold.

10. The viewing apparatus of claim 9, further comprising an inference circuit configured to perform a full inference for the frame, responsive to the comparing circuit determining that the total area covered does not exceed the threshold.

* * * * *